(12) United States Patent
Vandergeest et al.

(10) Patent No.: US 9,568,032 B2
(45) Date of Patent: Feb. 14, 2017

(54) WEDGE CLAMP FOR SECURING SAFETY GUARDS AROUND INDUSTRIAL EQUIPMENT

(71) Applicant: Vandergeest, Inc., Barrie (CA)

(72) Inventors: Paul Vandergeest, Barrie (CA); Karen Vandergeest, Barrie (CA)

(73) Assignee: Vandergeest, Inc., Barrie, Ontario (CA)

( * ) Notice: Subject to any disclaimer, the term of this patent is extended or adjusted under 35 U.S.C. 154(b) by 102 days.

(21) Appl. No.: 14/504,966

(22) Filed: Oct. 2, 2014

(65) Prior Publication Data
US 2015/0093191 A1 Apr. 2, 2015

(51) Int. Cl.
| | | |
|---|---|---|
| B25G 3/20 | (2006.01) |
| F16B 2/14 | (2006.01) |
| F16B 2/18 | (2006.01) |
| F16B 7/04 | (2006.01) |
| F16P 1/02 | (2006.01) |
| F16B 3/00 | (2006.01) |

(52) U.S. Cl.
CPC . *F16B 2/14* (2013.01); *F16P 1/02* (2013.01); *F16B 2/18* (2013.01); *F16B 3/00* (2013.01); *Y10T 403/7062* (2015.01); *Y10T 403/7064* (2015.01); *Y10T 403/7071* (2015.01); *Y10T 403/7079* (2015.01)

(58) Field of Classification Search
CPC ............... F16B 2/14; F16B 3/00; F16B 2/18; Y10T 403/7071; Y10T 403/7064; Y10T 403/7062; Y10T 403/7079
USPC ... 403/374.1, 374.5, 374.3, 378, 409.1, 410; 182/5; 24/136 R
See application file for complete search history.

(56) References Cited

U.S. PATENT DOCUMENTS

| | | | | |
|---|---|---|---|---|
| 2,917,799 A * | 12/1959 | Meighan | ................. | F16G 11/10 24/136 R |
| 3,492,702 A * | 2/1970 | Stafford | ................. | F16G 11/04 182/5 |
| 4,430,019 A * | 2/1984 | D'Alessio | ................. | E04G 7/26 182/178.1 |
| 5,119,529 A * | 6/1992 | Kaye | ...................... | B63B 21/08 24/136 R |
| 5,553,360 A * | 9/1996 | Lucas | ................... | F16G 11/046 24/115 M |
| 5,951,192 A * | 9/1999 | Collins | ................. | E02F 3/3622 37/468 |
| 6,256,841 B1* | 7/2001 | Ericson | ................... | B66B 7/085 24/136 R |
| 6,688,012 B1* | 2/2004 | Crain | ..................... | G01C 15/06 33/295 |
| 8,375,527 B1* | 2/2013 | Crow | ..................... | F16G 11/046 24/136 L |
| 2011/0176867 A1* | 7/2011 | Mosier | ...................... | F16B 2/14 403/409.1 |
| 2012/0039686 A1* | 2/2012 | Miller | ................... | B22D 41/00 411/355 |

* cited by examiner

*Primary Examiner* — Chi Q Nguyen
(74) *Attorney, Agent, or Firm* — Roger D. Emerson; Emerson Thomson Bennett, LLC

(57) ABSTRACT

A device for securing safety guards around machinery is described which includes a portable wedge clamp device which is inserted through both the safety guard and the post. The portable wedge clamp device includes a base wedge member and a corresponding drive wedge member. A set screw is used to prevent the drive wedge member from moving and becoming unlocked.

14 Claims, 7 Drawing Sheets

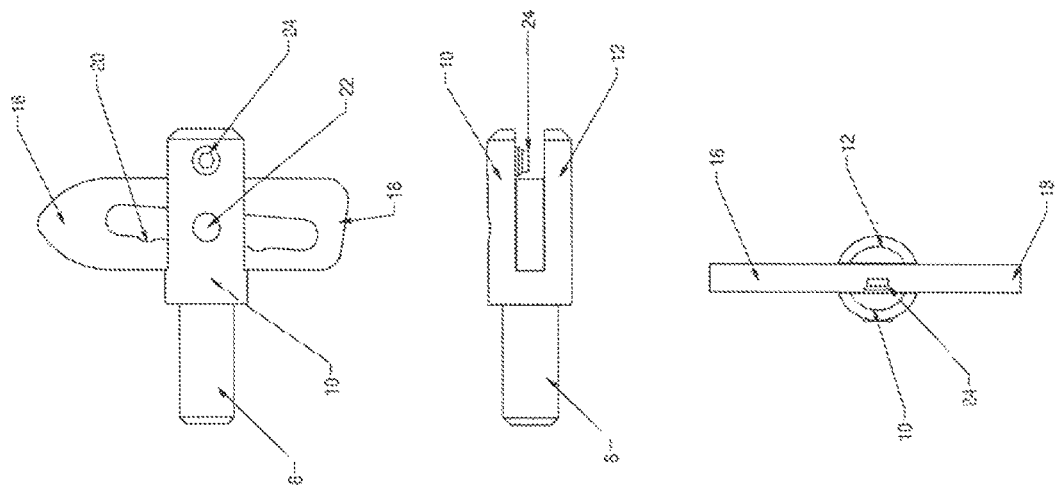

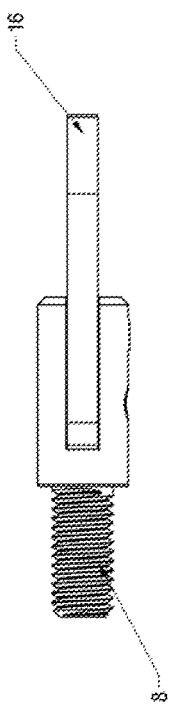
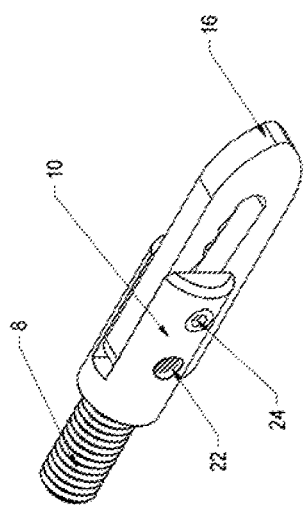
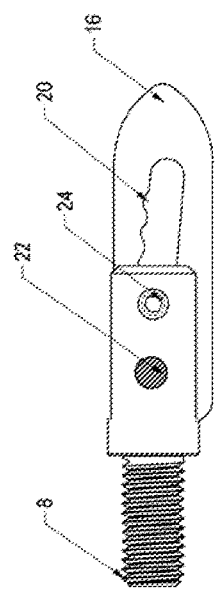
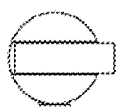
FIGURE 5
FIGURE 6
FIGURE 7
FIGURE 8

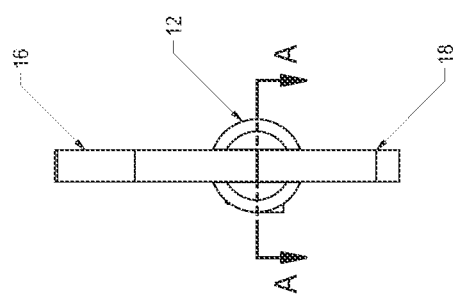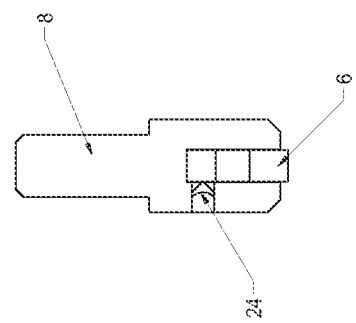
FIGURE 16
FIGURE 17

WEDGE CLAMP FOR SECURING SAFETY GUARDS AROUND INDUSTRIAL EQUIPMENT

I. CROSS-REFERENCE

This application claims priority under 35 USC §119(a) to Canadian Application Serial Number 2,828,665, filed on Oct. 2, 2013, which is herein incorporated by reference in its entirety.

II. BACKGROUND

A. Technical Field

This invention relates to a device for securing safety guards around mining and industrial equipment.

B. Description of Related Art

Safety Guards are used to keep workers safe from mining and industrial equipment when they are in operation. These safety guards must be kept closed and locked and, by most provincial and state laws, must be locked in such a manner that a tool is required to remove the locking means.

The act of requiring a tool to remove the safety guard was enacted to force the worker that is required to work on the equipment behind the safety guard to make an additional effort to remove the safety guard. This additional effort will make the worker think about the hazard that is behind the guard and use a safe practice when servicing the area.

When the safety guard is locked using hardware, such as nuts and bolts, the worker must remove the nuts and bolts completely in order to gain access to the industrial equipment. There is a risk that the nuts and bolts will fall and become caught in the industrial equipment. If the nuts and bolts fall and become lost, there is a risk that worker might not properly secure the safety guard. Further, if the safety guard is located 100 feet in the air, losing nuts and bolts can be inconvenient.

One way of securing the safety guard is to use a wedge clamp with a tie wrap. However, many inspectors do not consider that a tie wrap is a sufficient means for locking the wedge clamp and for requiring a "tool" to be used.

It would be advantageous to have a better system for locking the wedge clamp which is easy to remove and reinstall.

II. SUMMARY

Provided is a wedge clamp including a base wedge member and a cooperating drive wedge member. The drive wedge member is moveable between an initial open or unlocked position and a closed or locked position. When the drive wedge member is in the open or unlocked position, it is oriented in line with the base wedge member. When it is in the closed or locked position, it is perpendicular to the base wedge member.

According to other embodiments, the base wedge member of the wedge clamp can have a threaded end and a shaft end with a first arm and a second arm extending from the shaft end. The drive wedge member can have a bullet shaped end and a blunt end with a central channel that has one or more notches.

According to other embodiments, the wedge clamp can have a pin extending through one or both arms, thereby engaging the notches. The clamp wedge can also have a set screw that can lock or otherwise prevent the drive wedge member from rotating out of the closed or locked position and into the open or unlocked position. One embodiment of the set screw can prevent movement of the drive wedge member through pressure and/or friction.

According to other embodiments, the set screw can be used in place of or in conjunction with a tie wrap to further prevent movement of the drive wedge member.

III. BRIEF DESCRIPTION OF THE DRAWINGS

The disclosed wedge clamp may take physical form in certain parts and arrangement of parts, embodiments of which will be described in detail in this specification and illustrated in the accompanying drawings which form a part hereof and wherein:

FIG. 2 is a front view of the wedge clamp in closed position.

FIG. 3 is a top view of the wedge clamp in closed position.

FIG. 4 is a right side view of the wedge clamp in closed position.

FIG. 5 is a perspective view of the wedge clamp in open position.

FIG. 6 is a front view of the wedge clamp in open position.

FIG. 7 is a top view of the wedge clamp in open position.

FIG. 8 is a right side view of the wedge clamp in open position.

FIG. 16 is a right side view of the wedge clamp in closed position according to a second embodiment of the invention.

FIG. 17 is a right side view along section A-A of the wedge clamp in closed position according to a second embodiment of the invention.

IV. DETAILED DESCRIPTION

Figure 1:
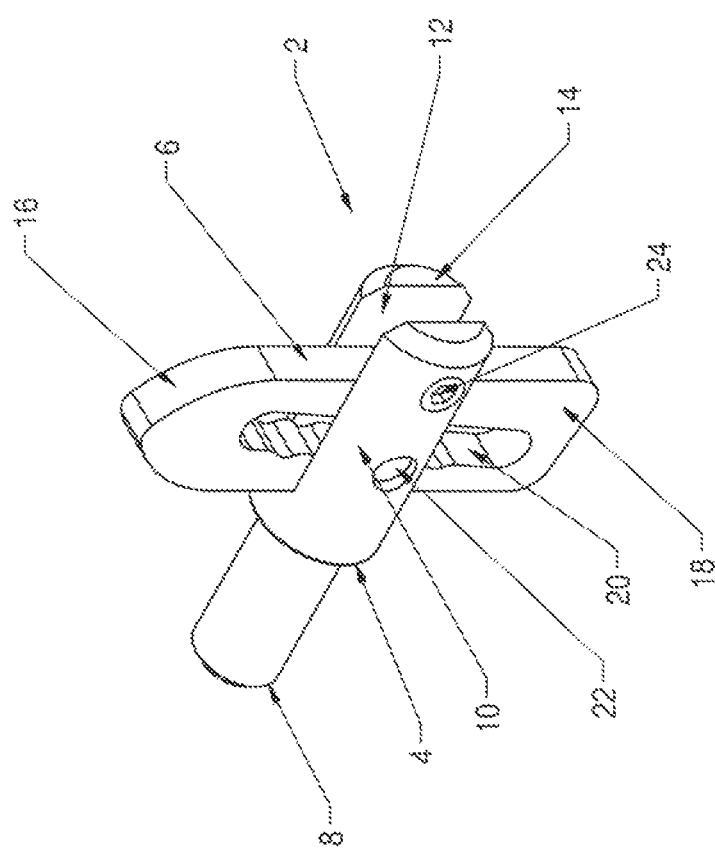
FIG. 1 is a perspective view of the wedge clamp in closed position.

Referring to FIG. 1, there is shown a portable wedge clamp device 2 comprising a base wedge member 4 and a cooperating drive wedge member 6 in its final closed and locked position.

The base wedge member 4 has a first end 8, which can be threaded, as seen more clearly in FIGS. 5-7, 9, and 10, a first arm 10 and second arm 12 forming a generally U-shaped portion or slot at the shaft end 14.

The cooperating drive wedge member 6 has a bullet-shaped end 16 and a blunt end 18 defining a central channel having a plurality of notches 20.

A pin 22 extends through the first arm 10 and second arm 12 and engages the notches 20. The pin 22 is shown shaded in FIGS. 5, 6, and 12 to illustrate that the pin is recessed within the first arm 10 and second arm 10 when engaged with the notches 20. Shading is omitted from the remaining Figures for clarity.

The cooperating drive wedge member 6 moves from an initial open or unlocked position where the drive wedge member 6 is oriented in line with the base wedge member 4 and a closed position where the drive wedge member 6 is perpendicular to the base wedge member 4.

A set screw 24 extends through first arm 10 to lock the cooperating drive wedge member 6 by preventing the drive wedge member 6 from returning to its initial open position oriented in line with the base wedge member 4.

Referring to FIGS. 2 to 4, the portable wedge clamp device 2 is shown in more detail. FIGS. 3 and 4 show the set screw 24 after it has been tightened to lock the drive wedge member 6 in place.

Referring to FIGS. 5 to 8, the portable wedge clamp device 2 is shown in its open and unlocked position. The set screw 24 has been loosened so that the drive wedge member 6 can move freely in place.

Figure 9:
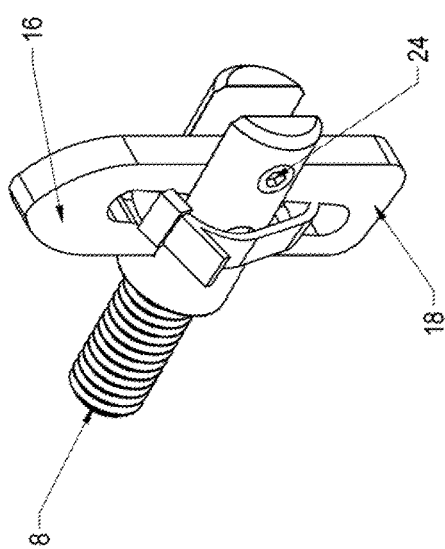
FIG. 9 is a perspective view of the wedge clamp in closed position and tie wrap.
Figure 10:
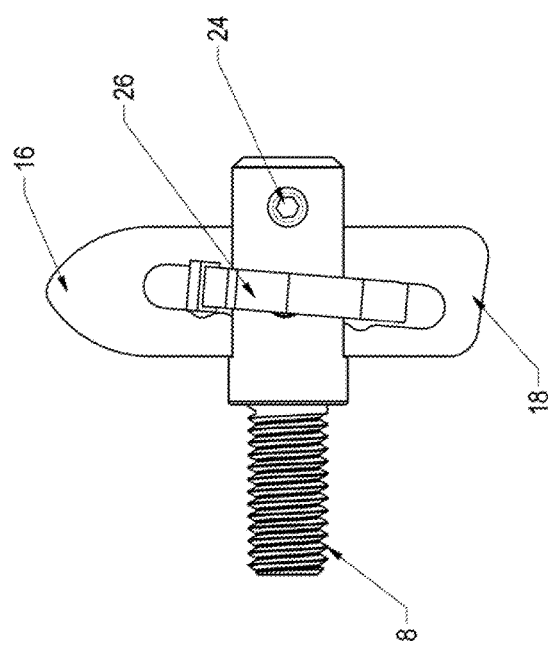
FIG. 10 is a front view of the wedge clamp in closed position and tie wrap.

Referring to FIGS. 9 and 10, an optional tie wrap 24 can be used to wrap through the central channel and around the first arm 10 and second arm 12 to provide additional security.

Figure 11:
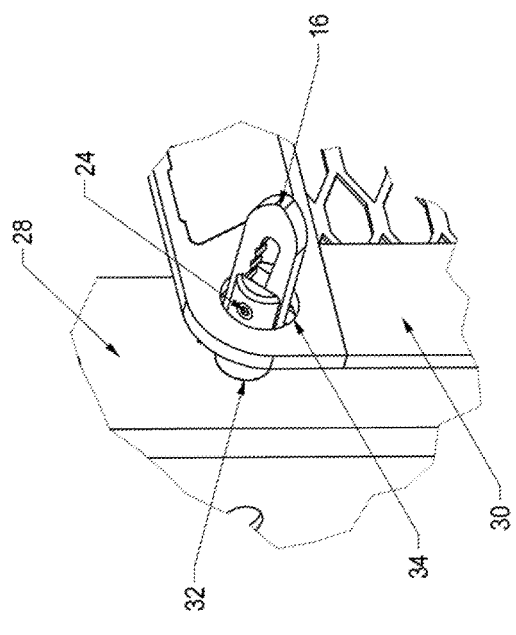
FIG. 11 is a perspective view of the post and safety guard showing the wedge clamp in open position.
Figure 12:
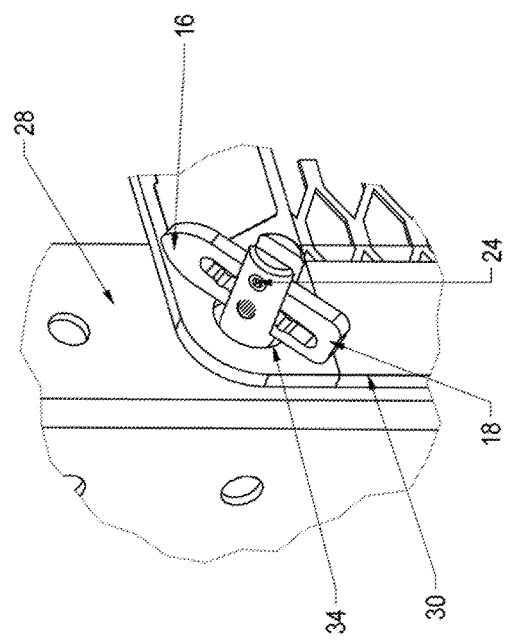
FIG. 12 is a perspective view of the post and safety guard showing the wedge clamp in closed and locked position.

As shown in FIGS. 11 and 12, in use the portable wedge clamp device 2 is used to fasten a safety guard 30 to a post 28.

Referring to FIG. 11, the portable wedge clamp device 2 is shown in its open or unlocked position where the drive wedge member 6 is oriented in line with the base wedge member 4 and both are inserted through a hole 32 in the post 28 and through a corresponding hole 34 in the safety guard 30.

One the drive wedge member has been completely inserted through the hole 34 in the safety guard 30, the portable wedge clamp device 2 is ready to be placed in the closed position and locked.

Referring to FIG. 12, the drive wedge member 6 is rotated so that it is perpendicular to the base wedge member 4. The set screw 24 is then tightened to secure the drive wedge member 6 in place.

Figure 13:
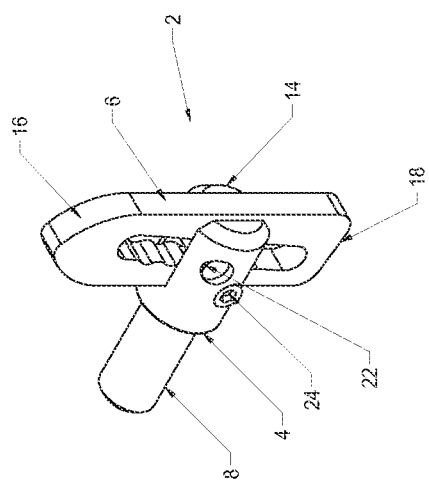
FIG. 13 is a perspective view of the wedge clamp in closed position according to a second embodiment of the invention.

Referring to FIG. 13, there is shown a second embodiment of the invention where the set screw 24 extends through first arm 10 to press firmly against the cooperating drive wedge member 6, thereby preventing the drive wedge member 6 from returning to its initial open position oriented in line with the base wedge member 4.

Figure 15:
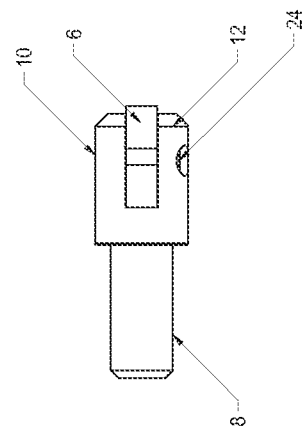
FIG. 15 is a top view of the wedge clamp in closed position according to a second embodiment of the invention.
Figure 14:
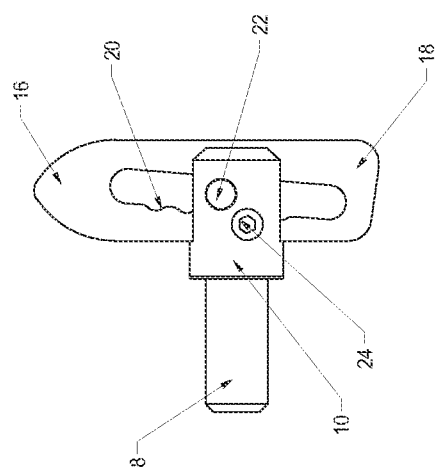
FIG. 14 is a front view of the wedge clamp in closed position according to a second embodiment of the invention.

Referring to FIGS. 14 to 17, the portable wedge clamp device 2 is shown in more detail. FIGS. 14 and 15 show the set screw 24 after it has been tightened to lock the drive wedge member 6 in place.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A wedge clamp comprising:
   (a) a base wedge member; and
   (b) a cooperating drive wedge member;
   wherein said base wedge member further comprises a threaded end, a shaft end, a first arm and a second arm, wherein said first and second arms extend from said shaft end,
   wherein said drive wedge member is moveable between an initial open or unlocked position and a closed or locked position,
   wherein when said drive wedge member is in an open or unlocked position, said drive member is oriented in line with said base wedge member,
   wherein when said drive wedge member is in a closed or locked position, said drive wedge member is perpendicular to said base wedge member, and
   wherein said drive wedge member further comprises a bullet-shaped end and a blunt end further defining a central channel having at least one notch.

2. The wedge clamp according to claim 1 wherein a pin extends through said first arm thereby engaging said at least one notch.

3. The wedge clamp according to claim 2 wherein a set screw extends through said first arm to thereby lock and prevent said drive wedge member from being moved to said initial open or unlocked position.

4. The wedge clamp according to claim 3 wherein a tie wrap is passed through said central channel and around said first arm and said second arm to prevent said drive wedge member from being moved to said initial open or unlocked position.

5. The wedge clamp according claim 4 wherein said pin extends through said first arm and said second arm thereby engaging said at least one notch.

6. The wedge clamp according to claim 5 wherein said set screw extends through said first arm to press firmly against said drive wedge member thereby preventing said drive wedge member from being moved to said initial open or unlocked position.

7. The wedge clamp according to claim 4 wherein said set screw extends through said first arm to press firmly against said drive wedge member thereby preventing said drive wedge member from being moved to said initial open or unlocked position.

8. The wedge clamp according claim 3 wherein said pin extends through said first arm and said second arm thereby engaging said at least one notch.

9. The wedge clamp according to claim 8 wherein said set screw extends through said first arm to press firmly against said drive wedge member thereby preventing said drive wedge member from being moved to said initial open or unlocked position.

10. The wedge clamp according to claim 3 wherein said set screw extends through said first arm to press firmly against said drive wedge member thereby preventing said drive wedge member from being moved to said initial open or unlocked position.

11. The wedge clamp according to claim 2 wherein a tie wrap is passed through said central channel and around said first arm and said second arm to prevent said drive wedge member from being moved to said initial open or unlocked position.

12. The wedge clamp according claim 11 wherein said pin extends through said first arm and said second arm thereby engaging said at least one notch.

13. The wedge clamp according claim 2 wherein said pin extends through said first arm and said second arm thereby engaging said at least one notch.

14. The wedge clamp according to claim 1 wherein a tie wrap is passed through said central channel and around said first arm and said second arm to prevent said drive wedge member from being moved to said initial open or unlocked position.

* * * * *